United States Patent [19]

Estaque

[11] 4,138,900
[45] Feb. 13, 1979

[54] SPEED CHANGE DEVICE
[75] Inventor: André F. Estaque, Bagneux, France
[73] Assignee: Societe Anonyme Automobiles Citroen, France
[21] Appl. No.: 780,070
[22] Filed: Mar. 22, 1977
[30] Foreign Application Priority Data
  Apr. 6, 1976 [FR] France .................. 76 09972
[51] Int. Cl.² .................. F16H 15/12; F16H 15/14
[52] U.S. Cl. .................. 74/199; 74/209; 74/212
[58] Field of Search .............. 74/199, 200, 201, 796, 74/208, 209, 212, 190

[56] References Cited
U.S. PATENT DOCUMENTS

| | | | |
|---|---|---|---|
| 1,110,793 | 9/1914 | Jenkins | 74/208 |
| 2,014,921 | 9/1935 | Almen | 74/200 |
| 3,246,532 | 4/1966 | Anderson et al. | 74/208 |
| 3,347,106 | 10/1967 | Flichy | 74/199 |
| 3,347,107 | 10/1967 | Flichy | 74/199 |
| 3,381,777 | 5/1968 | Flichy | 74/199 |
| 4,028,952 | 6/1977 | Leveque | 74/199 |
| 4,047,443 | 9/1977 | Leveque | 74/199 |

FOREIGN PATENT DOCUMENTS

| | | | |
|---|---|---|---|
| 133521 | 7/1949 | Australia | 74/208 |
| 502276 | 4/1951 | Belgium | 74/208 |
| 2551021 | 5/1976 | Fed. Rep. of Germany | 74/199 |
| 1231854 | 4/1960 | France | 74/796 |
| 1299609 | 6/1964 | France | 74/199 |
| 1603425 | 5/1971 | France | 74/199 |
| 448776 | 6/1936 | United Kingdom | 74/200 |

Primary Examiner—Samuel Scott
Assistant Examiner—William R. Henderson
Attorney, Agent, or Firm—Stevens, Davis, Miller & Mosher

[57] ABSTRACT

A speed change device comprises a stack of discs alternating with friction rings, the rings being disposed in a drum with which they are rotatable, the discs being rotatable with an input shaft extending into the drum. The stack is gripped between an abutment connected to the drum and a bell-shaped member fixed to an output shaft extending into the drum. The gripping is ensured by clamping means comprising elements having complementary conjugate surfaces and resilient means disposed between one of said elements and an axial abutment movable with the drum or bell-shaped member. The elements of the clamping means comprise a screw rotatable with the output shaft but axially movable therealong and a nut co-operating with the screw, the nut being rotatable with the drum but axially movable therealong.

9 Claims, 6 Drawing Figures

SPEED CHANGE DEVICE

BACKGROUND OF THE INVENTION

The invention relates to speed change devices of the kind comprising a stack of discs alternating with friction rings, the discs being connected for rotation to a first shaft, inter alia a driving shaft, but free to move along the shaft, and the friction rings being disposed so that they can move along the interior of a drum but are connected for rotation with the drum, the stack being gripped between an abutment connected for translatory movement to the drum and a bell-shaped member disposed inside the drum and secured to a second shaft, inter alia a driven shaft, means being provided for clamping the stack of discs and rings, the clamping means comprising elements having complementary conjugate surfaces disposed between the bell-shaped member and the drum and adapted to exert an axial force depending on the transmitted torque, the clamping means also comprising resilient means disposed between one of the elements bearing one of the conjugate surfaces and an abutment connected for translatory movement with the drum or bell-shaped members, means being provided for moving the shafts transversely with respect to one another, thus varying the thickness of the stack and varying the speed ratio between the input and the output.

Such speed change devices are known, and described, for instance, in the French Pat. No. 1,299,609.

The invention finds particular application in the case of speed change devices for motor vehicles.

An object of the invention is to provide an improved speed change device in which the means having complementary conjugate surfaces are simple to construct but efficient and able to exert an axial force depending on the transmitted torque, irrespective of the direction thereof.

SUMMARY OF THE INVENTION

According to the invention, a speed change device of the kind defined hereinbefore is characterised in that the elements of the clamping means are, respectively, a screw connected for rotation with the shaft bearing the bell-shaped member but free to move along the shaft, and a nut co-operating with the screw and connected for rotation with the drum but free to move along the drum, the resilient means being disposed between the screw and nut assembly and an abutment surface connected for translatory movement either with the bell-shaped member or the drum.

Preferably, the device comprises second resilient means disposed at that side of the screw and nut assembly remote from the side where the first resilient means are disposed.

Usually, the first resilient means comprise a stack of deformable resilient washers; the same applies to the second resilient means.

Preferably, the rigidity of the deformable resilient washer of the second resilient means bearing against the screw and nut assembly is equal to the rigidity of the resilient washer of the first resilient means bearing against the other side of the screw and nut assembly, so that the two washers, which have the same rigidity, remain parallel.

The second resilient means can comprise a single resilient washer.

Preferably the first resilient means are disposed between the screw and nut assembly and the end of the drum, whereas the second resilient means are disposed between the screw and nut assembly and the bell-shaped member.

The screw and nut are connected for rotation but free to move along the driven shaft and the drum respectively by means of longitudinal grooves formed respectively on the driven shaft and the inner surface of the drum, and by teeth formed in a central axial bore of the screw and on the external periphery of the nut. Advantageously, the sides and tips of the teeth on the screw and nut have surfaces comprising a convex or "boat-shaped" portion.

Lubricating means are provided for reducing friction between the screw and the nut and the friction at the grooves.

The lubrication means may comprise at least one aperture for fluid in the bell-shaped member, substantially level with the axis of the discs when the speed change device is at the lowest gear ratio and the two shafts are out of alignment to the maximum extent, the supply of lubricating fluid being via a central duct formed in the driving or input shaft, axial passages being preferably formed in the screw (or nut) for connecting the two opposite surfaces of the nut and screw assembly.

In a variant, the lubricating means have at least one radial aperture formed in the driven or output shaft, the radial aperture communicating with a longitudinal duct formed in the output shaft, for supplying lubricating fluid.

Further objects and advantages of the invention will appear from the following description of preferred embodiments, given with reference to the appended drawings.

DESCRIPTION OF PREFERRED EMBODIMENTS

Figure 1:
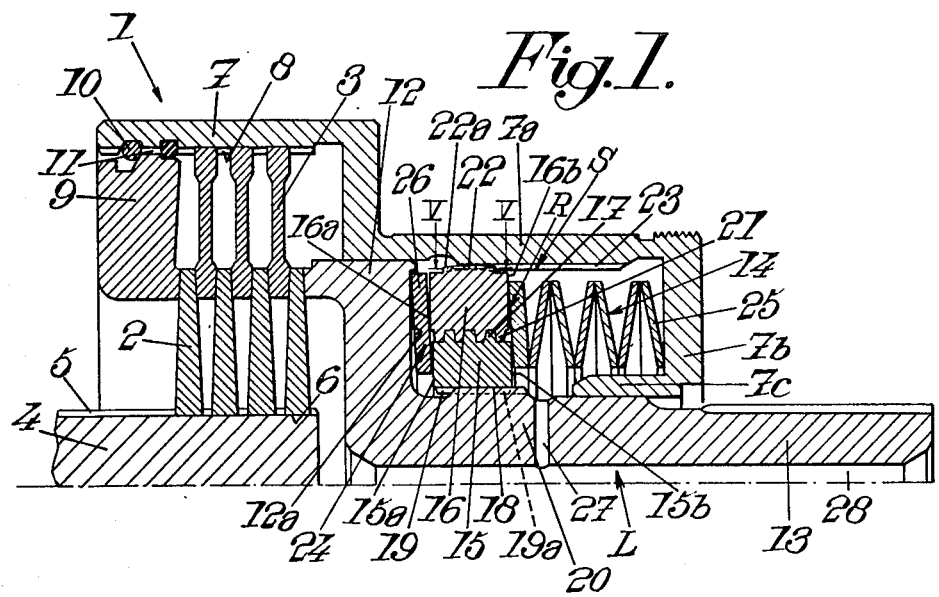
FIG. 1 is a longitudinal upper half-section through a speed change device according to the invention, shown in a position where the input shaft is coaxial with the output shaft, corresponding to direct engagement.
Figure 2:
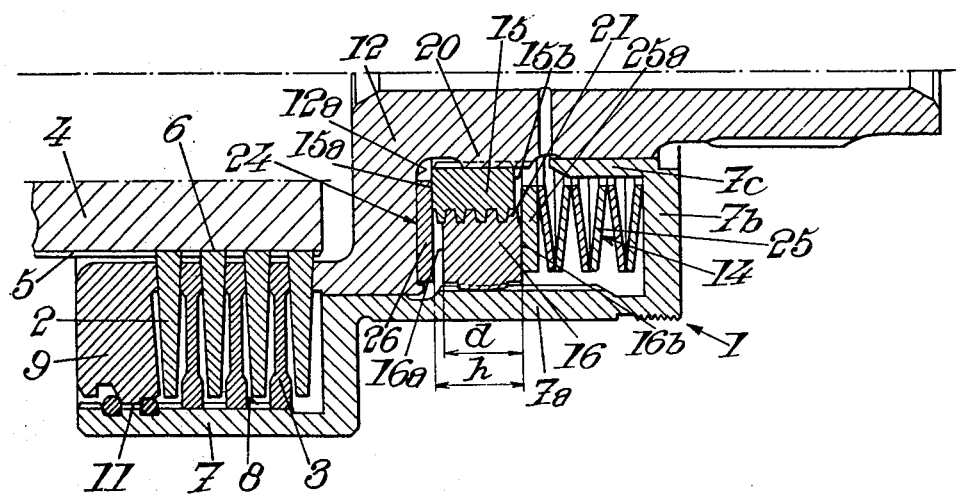
FIG. 2 is a longitudinal lower half-section through the speed change device shown in FIG. 1, but in the position corresponding to the lowest gear ratio, the axis of the input shaft being transversely offset to the maximum extent with respect to the output shaft.

The drawings, inter alia FIGS. 1 and 2, show a speed changed device 1 comprising a stack of discs 2 having frusto-conical surfaces alternating with friction rings 3. Discs 2 are connected for rotation with an input shaft 4 but are free to move along the shaft. Shaft 4 has grooves 5 co-operating with teeth on the periphery of a central aperture 6 of discs 2 threaded on shaft 4. As shown in the drawings, the thickness of discs 2 in the axial direction decreases with radial distance from shaft 4.

The friction rings 3 are disposed in a drum 7; at their outer periphery, rings 3 have teeth co-operating with longitudinal grooves 8 formed in the drum, so that rings 3 are connected for rotation with drum 7 but free to move along the drum.

The stack of discs 2 and rings 3 bears against an abutment 9 formed by a ring, connected for translatory movement to drum 7 by an axial stop in the form of a metal ring 10. Ring 9 is also connected for rotation to drum 7 by teeth 11 co-operating with grooves 8.

The stack of discs 2 and rings 3 is clamped between abutment 9 and a bell-shaped member 12 disposed inside drum 7 and secured to the second shaft 13, i.e., the output or driven shaft.

Means S are provided for clamping the stack of discs and rings. Means S comprise means R having complementary conjugate surfaces and adapted to exert an axial force depending on the transmitted torque. The clamping means S also comprise first resilient means 14.

Conventional means (not shown) are also provided for transversely moving shaft 4 with respect to shaft 13, thus varying the thickness of the stack and varying the speed ratio between the input and the output.

Means R respectively comprise a screw 15 connected for rotation to shaft 13 but free to move along the shaft, and a nut 16 co-operating with screw 15; nut 16 is connected for rotation to drum 7 but is free to move along the drum.

The first resilient means 14 are placed between the screw-nut assembly 15, 16 and an abutment surface formed by an end wall 7b of drum 7.

Drum part 7a, in which the nut and screw assembly is placed, is formed by a sleeve having a diameter less than that of the part containing rings 3. The end wall 7b of the drum has a central aperture bounded by a sleeve 7c secured to end wall 7b. Sleeve 7c is mounted so that it can freely move along and rotate around shaft 13.

Screw 15 comprises an annulus bearing a radially projecting helical thread 17 on its outer periphery. The rim has a central aperture 18 engaging around shaft 13. Aperture 18 has teeth 19 parallel to the axis of the rim and the axis of shaft 13 and adapted to co-operate with axial grooves 19a formed in the periphery of the part 20 of shaft 13 surrounded by screw 15, or disposed near screw 15. The grooves and teeth 19 co-operate so that screw 15 and shaft 13 are connected for rotation, but screw 15 is free to move along the axis of shaft 13.

Nut 16 comprises a ring having a helical thread 21 on the inner surface of a central aperture, the thread being adapted to co-operate with the screw thread 17. Advantageously, threads 17 and 21 have a trapezoidal cross-section.

Nut 16 has teeth 22 on its cylindrical outer surface, the teeth extending axially and being adapted to co-operate with longitudinal grooves 23 formed on the inner surface of sleeve 7a. Thus, nut 16 is connected for rotation with sleeve 7a but is free to move axially along the sleeve.

The axial length of screw 15 is equal to the distance between the transverse surfaces 15a, 15b and equal to the axial length of nut 16 between transverse surfaces 16a, 16b.

Advantageously, the tops of teeth 22 have a convex longitudinal or "boat-shaped" cross-section as shown in FIG. 2. The cross-section, as shown in FIGS. 1 and 2, is slightly convex.

Figure 5:
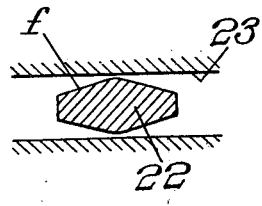
FIG. 5 is a longitudinal section through a tooth on the line V—V in FIG. 1.

As shown in FIG. 5, the same shape can be given to the sides f of teeth 22, so that the sides are bounded, as it were, by the surfaces of a convex dihedron or by a convex surface at a tangent to one face of the dihedron.

Advantageously, the tops of teeth 19 of screw 15 and the sides of teeth 19 are also given "boat-shaped" cross-sections.

Figure 6:
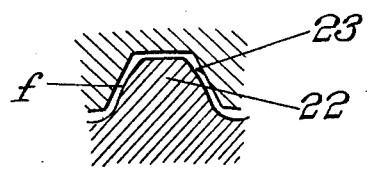
FIG. 6 is a cross-section of a tooth.

As shown in FIG. 6, the cross-section of sides f of teeth 22 and 19 is bounded by arcs of convex curves.

These sections or "boat-shaped" portions can prevent any jamming resulting from slanting of the nut and screw assembly during sliding, inter alia if, as a result of the clamping, member 12 becomes slightly inclined as a result of the clearances and deformation.

Device 1 comprises second resilient means 24 disposed between the nut and screw assembly 15, 16 and that surface 12a of member 12 which faces the last-mentioned assembly.

Advantageously, the first resilient means 14 are a stack of deformable resilient washers 25. Washers 25 have a central aperture having a diameter less than the outer diameter of screw 15 but sufficient to thread washers 25 around sleeve 7c. The outer diameter of washers 25 is less than the outer diameter of nut 16 but greater than the outer diameter of screw 15. Accordingly, the end washer 25a near the nut and screw assembly can, depending on circumstances, bear either on the adjacent transverse surface of nut 16 or on the transverse surface of screw 15.

Advantageously, the second resilient means 24 likewise comprise a stack of deformable resilient washers. In the embodiment shown in the drawings, the second resilient means 24 comprise a single deformable resilient washer 26 whose outer diameter, like that of the central aperture, is such that washer 26 can co-operate either with the adjacent transverse surface of nut 16 or with the transverse surface of screw 15, depending on the circumstances.

Preferably, washer 26 has the same rigidity as washer 25a. The two washers 26 and 25a, which operate in series and transmit the same axial force between member 12 and end 7b, thus remain substantially parallel.

Lubricating means L are provided for reducing friction between screw 15 and nut 16 and in the grooves provided on shaft 13 and end sleeves 7a for co-operating with teeth 19 and 22.

In the embodiment in FIGS. 1 and 2, the lubricating means L comprise at least one radial bore 27 in the output shaft 13. Bore 27 opens on to the outer surface of shaft 13 between sleeve 7c and the part 20 bearing the grooves for screw 15. The radial aperture communicates with a longitudinal duct 28 on shaft 13, for supplying lubricating oil.

Figure 3:
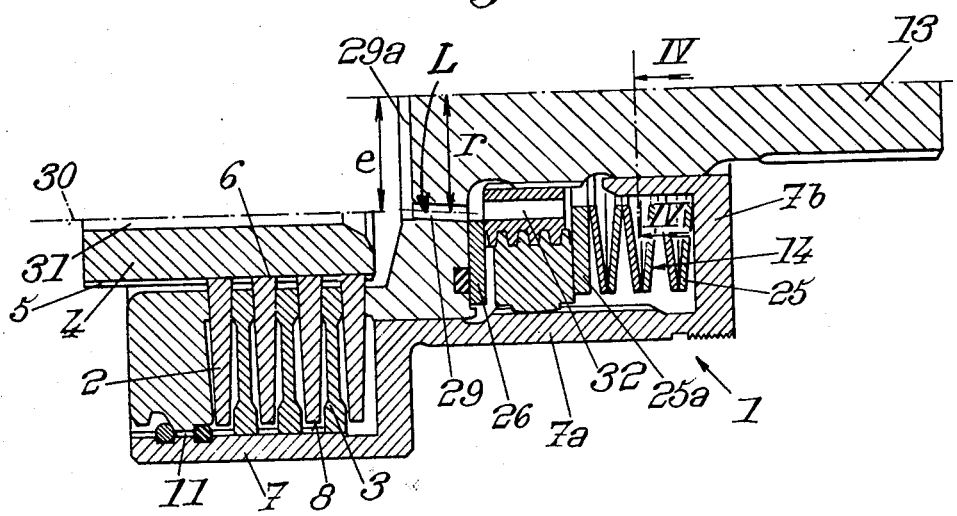
FIG. 3, which corresponds to FIG. 2, shows another speed change device according to the invention.
Figure 4:
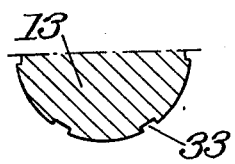
FIG. 4 is a partial section on line IV—IV of FIG. 3.

In the embodiment in FIG. 3, the lubricating means L comprise at least one oiling bore 29 in the bell-shaped member, which bore is substantially aligned with the axis 30 of discs 2 when the speed change device is in its lowest gear-ratio position, as shown in FIG. 3. Aperture 29 opens into a cylindrical cavity 29a formed on member 12 and coaxial therewith. Lubricating oil is supplied via a central duct 31 formed in the driving or input shaft 4.

Longitudinal passages 32 are formed in nut 15 for interconnecting the two opposite surfaces of the screw and nut assembly, so that the lubricating oil can reach the nut threads in all cases.

Preferably, there are three bores 29 regularly distributed around a circumference having a radius $r$ approximately equal to the maximum distance $e$ between the axis of the input shaft 4 and the axis of the output shaft 13.

This feature, as a result of centrifuging of the liquid, enables lubricating oil to reach the screw and nut assembly irrespective of the position of shaft 4. In addition, bores 29 are slightly inclined so that their axes extend away from the axis of shaft 13, when moving from the left to the right of FIG. 3. This inclination facilitates the flow of oil to threads 17 and 21, as a result of the centrifugal effect.

Helical grooves 33 are formed on the outer surface of the part or shaft 13 surrounded by sleeve 7c. The grooves are adapted for expelling the air from the chamber enclosing the clamping means, so that the chamber is full of lubricating oil when the speed change assembly rotates coaxially. There are e.g. six grooves 33, spaced at equal angles.

The gear ratio is changed in conventional manner by modifying the radial distance between the axis of shaft 4 and the axis of shaft 13. As a result of the frusto-conical shape of the faces of discs 2, a variation occurs in the thickness of the stack of discs 2 and rings 3 at the places where they are in contact. This results in axial sliding of discs 2 and rings 3 on the corresponding grooves, and axial relative movement of member 12 and end 7b, thus modifying the tension of the first resilient means 14 and the second resilient means 24.

When the tension of the first resilient means 14 and the second resilient means 24 is modified, the screw and nut assembly 15, 16 slides with respect to shaft 13 and sleeve 7a. The assembly 15, 16 is adapted to modify the clamping force of the stack of discs 2 and rings 3, depending on the transmitted torques.

The axial length of screw 15 is equal to that of nut 16. Accordingly, when the end faces 15a, 16a of the screw and nut are situated in the same transverse plane, the other end faces 15b, 16b (to the left in the drawings) are likewise in the same plane.

In that case, the total axial length of assembly 15, 16 is equal to the axial length d of the screw and nut. Accordingly, the total axial thickness of assembly 15, 16 is at a minimum.

When the relative positions of surfaces 15a, 16a on the one hand and 15b, 16b on the other hand are such that washers 26, 25a bear simultaneously against the screw and nut respectively, the torque transmitted by the speed change device is either zero or insufficient to overcome the force exerted by the resilient means at rest.

When the torque increases, nut 16 rotates with respect to screw 15 and, as a result of co-operation between the helical screw thread 17 and nut thread 21, screw 15 moves axially relative to nut 16, thus increasing the total axial length of assembly 15, 16.

In the case shown in FIG. 2, the total axial length h of the nut-screw assembly is equal to the axial distance between face 15a of screw 15 and face 16b of nut 16. FIG. 2 corresponds to the case where screw 15 has moved to the left with respect to nut 16. It is assumed, for example, that such a movement of the screw, during which face 15a projects with respect to face 16a on the side of member 12, corresponds to a pulling torque transmitted by the speed change device, when shaft 4 drives shaft 13.

Under some operating conditions, shaft 13 becomes the driving shaft whereas shaft 4 is driven. This is the case, for example, in a motor vehicle when the foot is raised from the accelerator pedal, when the engine acts as a brake and pulls backwards instead of forwards.

Under such conditions, the torque transmitted by device 1 is reversed with respect to the case considered previously. Since screw 15 and nut 16 are free to move along shaft 13 and drum 7a respectively, nut 16 can rotate or move longitudinally relative to screw 15, so that the transverse face 16a of nut 16 will project, e.g. with respect to face 15a, towards member 12, whereas face 15b of screw 15 will project in the direction of end 7b, with respect to face 16b. In that case the total axial length h of the nut-screw assembly will be equal to the axial distance between faces 16a and 15b. The resilient washer 25a will then bear against face 15b, whereas washer 26 will bear against nut face 16a.

Consequently when the torque is reversed, starting from the position shown in FIG. 2, face 16a moves axially from the right to the left in FIG. 2, to make contact with washer 26 at the moment when the torque is zero. Face 16a continues to move in the direction of member 12 up to a position corresponding to the new torque, which is in the opposite direction.

The first resilient means 14, like the second resilient means 24, are expanded or compressed simultaneously; since washers 26 and 25a have the same rigidity, they remain parallel since they are subjected to equal axial forces.

Consequently, a single nut and screw system can maintain a clamping force on the stack of discs 2 and rings 3 which depends on the torque transmitted by the speed change device, irrespective of the direction of the torque.

Preferably, washer 26 is constructed so that, during traction with the lowest gear ratio and the maximum transmitted torque, washer 26 is completely compressed against member 12 as shown in FIG. 2. Face 15a of screw 15 is in contact with washer 26. When the engine acts as a brake, at the highest gear, as shown in FIG. 1, face 16a of nut 16 comes in contact with washer 26 whereas face 15b of screw 15 is in contact with washer 25a.

When the transmitted torque is reversed, at the moment when the torque vanishes washers 26 and 25a are simultaneously in contact with screw 15 and nut 16, so that the stack of discs 2 and rings 3 is continuously clamped and at no time is screw 15 or nut 16 free between the two washers 26 and 25a, since this would produce a grinding noise during the transition from traction to braking by the engine, or vice versa.

I claim:

1. A speed change device comprising:
   a hollow drum defining a longitudinal axis and a radially inwardly extending first abutment;
   first and second shafts extending into said drum substantially parallel to said axis;
   a plurality of radially extending discs received on said first shaft, said discs being rotatable with said first shaft and axially movable along said first shaft;
   a second abutment within said drum, means connecting said drum to said second abutment for translatory movement;
   a bell shaped member disposed in said drum and fixed to said second shaft;
   a plurality of radially extending friction rings in said drum and engaged with the inner surface of said drum to rotate with said drum and to move axially within said drum, said discs and friction rings being interleaved to form a stack of alternate discs and rings gripped between said second abutment and said bell-shaped member;

clamping means comprising a screw rotatable with said second shaft and axially movable along said second shaft and a nut cooperating with said screw to form a screw and nut assembly, said nut being rotatable with said drum said screw and nut having complementary conjugate surfaces exerting an axial force dependent on the transmitted torque, and axially movable along said drum, first resilient means being disposed between one end of said screw and nut assembly and said first abutment; second resilient means acting between the other end of said screw and nut assembly and the inside of said bell-shaped member; and means for moving said first and second shafts radially with respect to one another whereby the axial length of said stack and the speed ratio between said first and second shafts are varied.

2. A device as claimed in claim 1, wherein said resilient means comprise a stack of resiliently deformable washers.

3. A device as claimed in claim 1, wherein said second resilient means comprise at least one resiliently deformable washer.

4. A device as claimed in claim 1, wherein said first and second resilient means each comprise a resiliently deformable washer bearing on a respective end of said nut and screw assembly, said washers having equal rigidity.

5. A device as claimed in claim 1, wherein said second shaft and said inner drum surface are formed with longitudinal grooves, said screw has a central axial bore formed with internal axial teeth and said nut has external axial teeth on its periphery, said grooves of said second shaft co-operating with said internal teeth of said screw, said grooves of said inner drum surface co-operating with said external teeth of said nut.

6. A device as claimed in claim 5, wherein the tips of said internal teeth of said screw and said external teeth of said nut have a convex longitudinal cross-section.

7. A device as claimed in claim 5, wherein the sides of said internal teeth of said screw and said external teeth of said nut have a convex longitudinal cross-section.

8. A device as claimed in claim 1, further comprising lubricating means for reducing friction in said screw and nut assembly, said lubricating means comprising a longitudinal duct formed in said second shaft and at least one radial bore formed in said second shaft and communicating with said longitudinal duct.

9. A device as claimed in claim 1, wherein said bell-shaped member and said drum define a annular cavity around said second shaft housing said screw and nut assembly, said device further comprising lubricating means for reducing friction in said screw and nut assembly, said lubricating means comprising a longitudinal duct formed in said first shaft and at least one axial bore formed on said bell-shaped member and opening into said cylindrical cavity, said axial bore being substantially aligned with the axis of said discs when the speed change device is in its lowest gear ratio.

* * * * *